Oct. 30, 1962     H. L. ROBSON ETAL     3,061,409
PROCESS FOR PREPARING SODIUM CARBONATE
Filed June 21, 1960
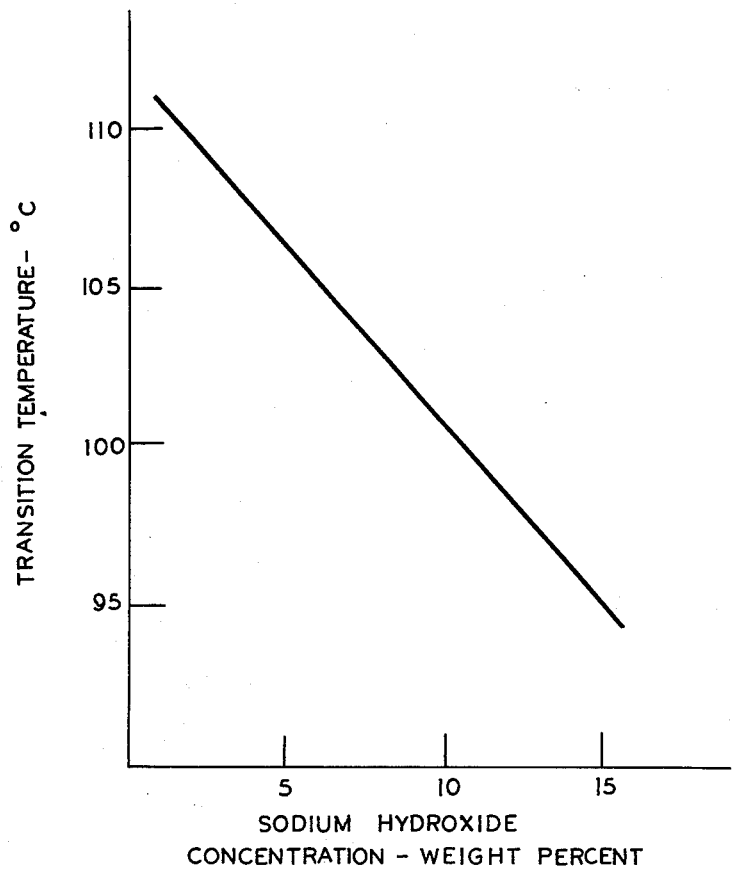
INVENTORS
HOMER L. ROBSON
BRUNO H. WOJCIK
BY
AGENT ൹nited States Patent Office 3,061,409
Patented Oct. 30, 1962

3,061,409
PROCESS FOR PREPARING SODIUM
CARBONATE
Homer L. Robson, Lewiston, N.Y., and Bruno H. Wojcik, Ruxton, Md., assignors to Olin Mathieson Chemical Corporation, a corporation of Virginia
Filed June 21, 1960, Ser. No. 37,715
2 Claims. (Cl. 23—63)

This invention provides a method for producing a dense form of anhydrous sodium carbonate which contains no dust and which is particularly resistant to abrasion. Thus, during handling and shipping, the sodium carbonate produced by this method does not form dust as do the other types of dense sodium carbonates produced by most contemporary processes. In the glass making industry the sodium carbonate dust is objectionable because the flames in the glass furnace lift the fine particles up against the ceramic roof of the furnace attacking the refractories and decreasing the life of the furnace.

A further advantage of the novel process of this invention is that it is carried out at atmospheric pressure thus obviating the need for costly pressure equipment as well as the hazard involved with working at super-atmospheric pressure. In the present specification and claims the term light ash refers to sodium carbonate made by calcining crude ammonia soda, usually obtained as a washed filter cake. The solid phase in this cake is about 95% sodium bicarbonate and 4–5% ammonium bicarbonate, depending on the strength of ammonia in the solution from which the bicarbonate was precipitated. The salt, usually considered a solid solution of ammonium bicarbonate in sodium bicarbonate, forms partly in characteristic sheaf-like structures, composed of many prism-like crystals somewhat pointed on each end with the aggregate slightly constricted in the middle. In addition to the sheaf-like forms, there are some irregular groups of prisms, some crossed twin forms and some individual crystals. The filter cake is normally washed with cold water to remove the ammonium chloride and salt and then sent to calciners, which drive off the ammonium bicarbonate and convert the sodium bicarbonate to sodium carbonate. As a result of the loss of ammonia, carbon dioxide and water, the calcined product has approximately half the weight of the dried crude ammonia soda. During the calcining, the bundles of crystals retain their shape, so that the resulting "light ash" is a pseudomorph after the crude ammonia soda, and on microscopic examination will show the same sheaf-like bundles, usually with numerous pointed ends on the bundled prisms. The light ash normally has a bulk density, as filled into bags, of about 0.55. It contains considerable fine material.

The term dense ash as used in the present specification and claims refers to a dense form of anhydrous sodium carbonate containing little or no fine material at the time of its preparation. Several methods are employed in converting light ash to dense ash. In all of these the light ash is first converted to sodium carbonate monohydrate, and the monohydrate then calcined to obtain the dense form. In the most popular method the hot light ash and hot water are blended in a large pug mixer. The hot water is in slight excess of the amount required to form the monohydrate. It is usual practice to have the hot water at about 80° C. to boiling. The heat of hydration is considerable so that steam is evolved from the mix. The hydration thus takes place at about 103° C. in an atmosphere of steam. Sufficient time is allowed for the hydration to go substantially to completion. After hydration the damp monohydrate is discharged to a calciner in which it is first dried and then calcined to form the dense ash. In this process some of the ash is converted to the standard, boat-shaped crystals of monohydrate. Much of the material, however, forms clusters of monohydrate crystals. Some lumps form, and as these lumps are aggregates of boat-shaped crystals, there is considerable pore space, which is filled with a saturated solution of sodium carbonate monohydrate. In drying, a skin of sodium carbonate monohydrate may form over the entrances to the pore spaces. On further heating steam pressure will blow an opening in this skin and the solution will pass to the outside of the lumps and deposit either on the outside of the lump or on adjacent crystals in the form of a loose deposit. This loose deposit is a prime source of the "developable dust" which causes trouble in the glass industry. In addition, the lumps are frequently too large, and exceed the screen limits normally set for dense ash. These normally call for all material of a specified percent, such as 98%, to pass a 20-mesh screen, and material in the 30 mesh to 70 mesh range is preferred. The lumps can be removed by screening. Alternately, the oversize can be crushed and re-screened. All dense ash is screened and the fines are taken out and used for other purposes. Normally the amount of material passing 100 mesh would be between 1 and 4% if the dense ash is for glass manufacturing use. Some dense ash or "intermediate" grades of ash are allowed a higher content of fines. However, where the lumps have been crushed and screened so that the broken pieces fall in the 20 mesh to 100 mesh range, the broken crystals formed by crushing frequently have sharp and easily abraded edges. Broken crystals, whether formed by crushing of oversize lumps or by other handling, are another source of developable dust. The developable dust becomes actual, free dust during shipping and handling at the glass plant where the ash is normally unloaded by some mechanical means, and conveyed through elevators, belts and pneumatic means to bins. It is then transferred from the bins to weight scales, to batch mixers and finally conveyed to and fed into the glass melting furnace.

The boat-shaped particles of dense ash, which are pseudomorphs after sodium carbonate monohydrates, have an excellent resistance to abrasion. Material composed solely of boat-shaped particles, which is centrifuged to a good dryness before calcining, may show less than 0.1% developable dust. Accordingly, an aim of this invention has been to prepare dense ash by a process which would make most of the particles in this form. This means converting the light ash to individual crystals to monohydrate, avoiding as far as possible clusters and aggregate growths and of course avoiding any lumping of the material.

It has been discovered that large boat-shaped crystals of sodium carbonate monohydrate, which contain substantially no crystal clusters, aggregate material or lumps can be grown by adding hot, light ash to a boiling, vigorously stirred solution saturated with respect to sodium carbonate and which contains sodium hydroxide. Slight cooling of the solution results in the precipitation of sodium carbonate monohydrate which, when later calcined, produces anhydrous sodium carbonate having little or no dust or developable dust. The presence of the sodium hydroxide somehow retards the formation of sodium carbonate monohydrate nuclei when the mixture is cooled. In this way the sodium carbonate monohydrate crystals which do form during the cooling step grow larger because they are relatively few in number. In this way a product free of the disadvantages described above can be produced.

According to this invention, dry, hot light ash is added to a hot, saturated solution of sodium carbonate containing 5% to 15% by weight of sodium hydroxide based on the weight of the water and dissolved sodium carbonate. The temperature of the solution should be between 95° and 110° C., decreasing in this range as the concentration of sodium hydroxide increases. With 5% of the latter a temperature of about 106° C. is necessary, while at a sodium hydroxide content of 15% a temperature of about 95° C. is above the transition temperature and hydration of the sodium carbonate is prevented. The light ash is added to the extent that the slurry formed contains from about 20% to about 40% by weight of undissolved ash. The temperature of the light ash introduced should preferably be not more than about 6° C. cooler than the solution to avoid local cooling thereof which would result in premature formation of the monohydrate crystals. After the slurry is prepared it is cooled to at least 2° C. but not more than about 7° C. below the transition temperature causing crystals of the desired sodium carbonate monohydrate to form and grow. This transition temperature varies uniformly from about 106° C. with 5% sodium hydroxide in the mother liquor to about 95° C. with 15% sodium hydroxide in the mother liquor as shown by the graph of the drawing. The graph shows the transition temperature of anhydrous sodium carbonate to its monohydrate plotted against the sodium hydroxide concentration in percent based on the water, dissolved sodium carbonate and sodium hydroxide. In addition to decreasing the transition temperature, the sodium hydroxide elevates the boiling point of the solution making it possible to work at atmospheric pressure with 5% to 10% sodium hydroxide. If the slurry is cooled more than 7° C. below the transition temperature, many seeds of the monohydrate form quickly and an undesirably high proportion of fines result. About 0.2 to 2 hours are required to complete the transition from anhydrous to monohydrated sodium carbonate under these conditions. The monohydrate crystals are then separated, for example, by filtration or with a centrifuge, dried and calcined. The mother liquor can be replenished with an amount of water equal to that removed in hydrating the sodium carbonate and reused.

An especially convenient, continuous method for operation of the process of this invention involves preparation of the hot, light ash slurry as described above, in a first tank. This hot slurry is continuously prepared in the first tank and continuously withdrawn and sent to a second tank where it is cooled to below the transition temperature. From the second tank there is continuously removed a portion of the slurry which is filtered to obtain the monohydrated sodium carbonate product. The mother liquor is used to prepare the first slurry by admixing it with the hot, light ash and make-up water.

*Example I*

About 1800 grams of an aqueous solution containing 7.24 percent by weight of sodium hydroxide and 20.3 percent by weight of sodium carbonate was heated to 107° C. whereupon 320 grams of heated, light ash was added thereto, with good stirring, over a 5 minute period. The slurry was then stirred at 107° C. for an additional 30 minutes after which time microscopic examination showed no monohydrate crystals present in the sodium carbonate slurry.

This slurry was slowly cooled and stirred, reaching a temperature of 104° C. in 25 minutes. The slurry was then held at this temperature for 20 minutes while a few monohydrate crystals formed. The slurry was then cooled to 102.5° C. and held between this temperature and 102° C. until conversion of the anhydrous crystals to monohydrate was complete. As conversion to monohydrate proceeded, the slurry changed in appearance, appearing more ice-like or transparent. Crystals in the 30 to 50 mesh range were observed to have a length to width ratio of 3.5 to 4.5, with smaller crystals less elongated. When these crystals were heated at 220° F. to 250° F. they dried to form a stable form of dense ash which resisted dust formation during handling.

*Example II*

About 1000 grams of an aqueous solution containing 6.3 percent sodium hydroxide and saturated with sodium carbonate was boiling at 106.5° C. Two hundred and twelve grams of light ash were dispersed in the solution after which it was cooled to 100° C. It was held at 99° to 100° C. while the transformation of anhydrous sodium carbonate to sodium carbonate monohydrate took place. The crystals were centrifuged off and washed with 25 grams of a saturated solution of sodium carbonate, while on the centrifuge. The crystals were then dried. The dried product had 52 percent by weight of the crystals in the 30 to 70 mesh range, with the larger crystals showing a length to breadth ratio of 3:1 to 4:1. The higher quality of particles finer than 70 mesh was ascribed to the cooling of the solution through 6° C. rather than the preferred range of just 2 to 4 degrees below the transition temperature. When the crystals were heated at 220° F. to 250° F. they dried to form a stable form of dense ash which resisted dust formation during handling.

We claim:

1. A process for preparing dense anhydrous soda ash which comprises forming a slurry by adding light soda ash to an aqueous solution maintained at about 95° to 110° C. saturated at that temperautre with dissolved soda ash and containing from about 5 to 15 percent of caustic soda based on the weight of the water and the dissolved soda ash, cooling the slurry to about 88 to 104° C. but not less than 2° C. and not more than 7° C. below the temperature of transition of anhydrous soda ash to its monohydrate in the presence of the caustic, holding the slurry at the reduced temperature until the transition of anhydrous soda ash to its monohydrate is essentially complete, separating the sodium carbonate monohydrate from the slurry at the reduced temperature, drying and calcining the monohydrate to anhydrous, dense soda ash.

2. The cyclic process which comprises the process of claim 1 and in which the liquor from the separation of the sodium carbonate monohydrate is the aqueous solution to which light soda ash is added.

References Cited in the file of this patent

UNITED STATES PATENTS 2,133,455    Keene    Oct. 18, 1938
2,670,269    Rahn    Feb. 23, 1954